United States Patent [19]

Kobayashi et al.

[11] 3,865,817

[45] Feb. 11, 1975

[54] OXONOL DYES AND PROCESS FOR PREPARING OXONOL DYES

[75] Inventors: Teruo Kobayashi; Kazuo Inoue; Hiroshi Sawaguchi, all of Kanagawa, Japan

[73] Assignee: Fuji Photo Film Co., Ltd., Kanagawa, Japan

[22] Filed: May 1, 1973

[21] Appl. No.: 356,226

[30] Foreign Application Priority Data
May 2, 1972  Japan.............................. 46-43868

[52] U.S. Cl. ....... 260/240.2, 96/84 R, 260/290 HL, 260/290 R, 260/294.9, 260/310 A, 260/566 B
[51] Int. Cl............................................ C09b 23/04
[58] Field of Search................................. 260/240.2

[56] References Cited
FOREIGN PATENTS OR APPLICATIONS
43-3504   2/1968   Japan.............................. 260/240.2

1,177,429   1/1970   Great Britain................... 260/240.2

Primary Examiner—John D. Randolph
Attorney, Agent, or Firm—Sughrue, Rothwell, Mion, Zinn & Macpeak

[57] ABSTRACT

Oxonol dyes represented by the formula:

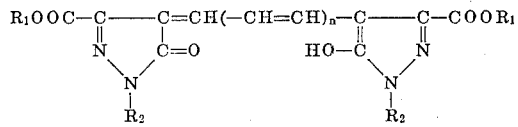

where $R_1$ and $R_2$ and n are as defined in the specification. A condensation process for preparing the same is also described.

11 Claims, No Drawings

OXONOL DYES AND PROCESS FOR PREPARING OXONOL DYES

BACKGROUND OF THE INVENTION

1. Field of the Invention

The present invention relates to novel oxonol dyes and to a process for preparing such novel oxonol dyes.

2. Description of the Prior Art

Somewhat similar dyes are disclosed in British Pat. Nos. 506,385 and 1,177,429. These dyes do not illustrate the superior utility of the dyes of the present invention.

SUMMARY OF THE INVENTION

According to the present invention, oxonol dyes represented by the following formula (I) are provided:

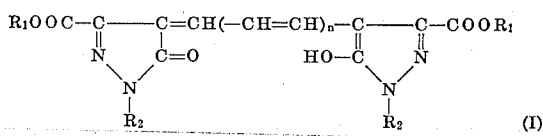

(I)

wherein $R_1$ represents an alkyl group, i.e., a substituted or unsubstituted alkyl group (e.g., methyl, ethyl, hydroxyalkyl such as hydroxyethyl, cyanoalkyl such as cyanoethyl, hydroxyalkoxyalkyl such as hydroxyethoxyethyl, propyl, isopropyl, butyl, tert-butyl, hexyl, octyl, decyl, dodecyl, pentadecyl, octadecyl, or benzyl, etc.) or an aryl group, i.e., a substituted or unsubstituted aryl group (e.g., phenyl or naphthyl based materials such as phenyl, alkylaryl, e.g., tolyl, ethylphenyl, halogenoaryl, e.g., chlorophenyl, alkoxyaryl, e.g., methoxyphenyl, or naphthyl, etc.), $R_2$ represents an alkyl group having a sulfonic acid group or carboxyl group (e.g., sulfomethyl, carboxymethyl, sulfoethyl, carboxyethyl, sulfopropyl, sulfo-2-methylpropyl, sulfo-2,2-dimethylpropyl, sulfobutyl, carboxybutyl, sulfo-4-ethylbutyl or sulfopentyl etc.), n is 0, 1 or 2, and the methine chain may be substituted by an alkyl group (e.g., methyl, ethyl, hydroxyalkyl, e.g., hydroxymethyl, propyl, t-butyl, etc.) or an aryl group (e.g., phenyl etc.).

The scope of $R_1$ and $R_2$ is broad. However, so long as the general criteria of alkyl and aryl for $R_1$ and carboxyl or sulfonic acid substituted for $R_2$ is met, these moieties can be freely selected, and the substituted forms above are not limited. Considering the ease of availability of starting materials, however, any alkyl moiety in $R_1$, be it unsubstituted or substituted, preferably has 1–18 carbon atoms. This is a commercial rather than technical limitation, however. Further, though non-limitative, the $R_2$ alkyl groups with 1–6 carbon atoms are preferred. In $R_2$, one carboxyl or sulfonic acid group positioned on a terminal carbon atom is sufficient to obtain te effects of the invention.

The oxonol dyes represented by formula (I) can be prepared by condensing pyrazolone derivatives represented by the following formula (II) with compounds represented by the following formulae (IIIa), (IIIb), (IIIc), (IIId) and (IIIe) in the presence of a base:

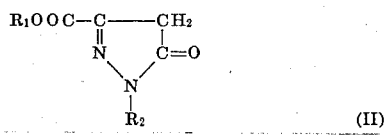

(II)

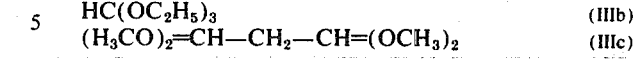

(IIIa)

$HC(OC_2H_5)_3$ (IIIb)

$(H_3CO)_2=CH-CH_2-CH=(OCH_3)_2$ (IIIc)

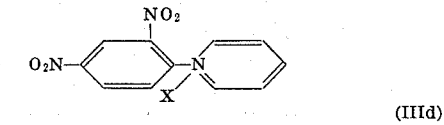

(IIId)

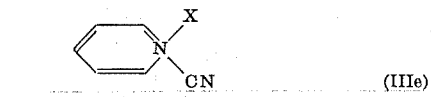

(IIIe)

wherein $R_1$, $R_2$ and n each have the same meaning as described above, and X represents an anion (e.g., chloride, bromide, iodide, thiocyanate, sulfamate, perchlorate, methylsulfate, ethylsulfate and p-toluenesulfonate, etc.). Any monovalent anion which does not interfere with the reaction can be used for X.

In the case that the dyes represented by formula (I) have the above mentioned substituents in the methine chain, the compounds represented by formulae (IIIa) – (IIIe), of course, should have corresponding substituents.

DETAILED DESCRIPTION OF THE INVENTION

As the base, triethylamine, diethanolamine, pyridine, piperidine and ammonia gas, etc., are preferably used. Inorganic bases such as ammonium carbonate, sodium carbonate, caustic soda, caustic potash may in general be used with success. Organic bases are preferred, however, since they are easily soluble in the reaction mixture. The amount of base used is generally over equimoler of the pyrazolone. Slightly in excess of 1 mol to 3 mols per mol of pyrazolone is preferred. 1.5–2.5 mols per mole of pyrazolone will commonly be used on an industrial scale.

The condensation reaction is advantageously carried out using a solvent which has the capability of dissolving the pyrazolone derivatives represented by the formula (II). As such solvents, alcohols (e.g., methanol, ethanol, isopropanol and butanol, etc.), ethylene glycol monoalkyl ethers (e.g., ethylene glycol monomethyl ether and ethyleneglycol monoethyl ether, etc.), amides (e.g., acetamide, dimethylformamide and dimethylacetamide, etc.), dimethylsulfoxide or miscible mixtures thereof can be used. Polar solvents are preferred. There is not limitation on the boiling point of solvents. In general, since compounds (III) are more soluble than the pyrazolones, the solvents easily dissolve compounds (III). About 2 to 10 parts of solvent per part by weight of pyrazolones is preferred on an industrial scale. The amount in theory is merely that needed for dissolution.

The reaction is advantageously carried out at a temperature up to the boiling point of the solvent used. Since pentamethine dyes (n is 2 in the formula (I)) are relatively unstable to heat, it is prefered to carry out the reaction to form the pentamethine dyes with cooling. Therefore, a prefered temperature range is from 0°C to the boiling point of the solvent used.

It is preferred that two moles of the pyrazolone derivative represented by the general formula (II) be employed with respect to a compound represented by any one of the general formulae (IIIa) through (IIIe), inclusive. Most preferably, in view of the desire to utilize pyrazolone in the reaction as completely as possible, an additional 0.1 to 0.2 mols of the pyrazolone are used in excess of the 2-fold molar minimum ratio which is preferred.

The pressure of reaction and time of reaction are substantially non-critical, and reaction is usually conducted at normal pressure for times sufficient to complete the reaction. Representative reaction times are set out in the specific Examples at a later point in the specification.

The pyrazolone derivatives represented by formula (II) can be prepared by known processes. For example, the process described in Annalen der Chemie, vol. 294, pages 232 (1896) can be used. For example, 1-sulfopropyl-3-carboethoxy-5-pyrazolone can be produced by heating the monosodium salt of ethyl oxalate and sulfopropylhydrazine in a weakly alkaline aqueous solution. Further the process described in "Jikken Yuki Kagaku" written by Seitaro Yamaguchi, published by Nankodo Co. (1954), page 812 can be used. For example, 1-sulfopropyl-3-carboethoxy-5-pyrazolone can be prepared by slowly adding hydrazine hydrate to an ethanol solution of ethyl oxalate with stirring at room temperature and heating the resulting 1-H-3-carboethoxy-5-pyrazolone together with 1,2-oxathiolan-2,2-dioxide at 130°C in an oil bath with stirring.

The compounds represented by the formulae (IIIa)–(IIIe) which are raw materials for forming the methine chain of the dyes represented by the formula (I) can also be prepared by well known processes. Namely, the compounds represented by the formula (IIIa) can be prepared by the process described in Chemical Abstracts, vol. 28, page 493 (1934), Berichte der Deutschen Chemischen Gesellschaft, vol. 36, page 2667 (1903) or Annalen der Chemie, vol. 330, page 367 (1932). The compounds represented by formulae (IIIb) and (IIIc) are commercially available. The compounds represented by formula (IIId) can be prepared by heating 0.1 mol of 2,4-di-nitrochlorobenzene and 0.1 mol of pyridine in 50 ml of acetone for 2 hours on a water bath. The compounds represented by formula (IIIe) can be prepared by dissolving 0.1 mol of cyanogen bromide in 100 ml of ether, adding dropwise 0.1 mol of pyridine while cooling, and stirring thereafter at room temperature for two hours.

In the dyes prepared by the process of this invention, the sulfonic acid group or the carboxyl group can be in the form of a salt such as an alkali metal salt (e.g., sodium, potassium) or an ammonium salt. These salts can be easily produced by known processes. For example, the potassium salt can be precipitated by adding a methanol solution of potassium acetate or potassium hydroxide to a dye solution.

The oxonol dyes of the present invention are distinguished from known oxonol dyes because they have a carboxylic acid ester bond at the 3-position of the pyrazolone ring and an alkyl group having a water soluble group at the 1-position of the pyrazolone ring.

The oxonol dyes according to the present invention are not only characterized by such a new structure but they are also superior to known dyes because they have excellent properties based on the difference of such structure. Namely, when they are used in a light absorbing layer (e.g., antihalation layer and anti-irradiation layer) or a filter layer of a photosensitive material they easily decolorize as compared with known oxonol dyes in which the 3-position of the pyrazolone ring is substituted with a methyl group or carboxyl group, and consequently they have the excellent characteristic that residual color does not remain in the photographic materials. Our dyes are particularly suitable for coloring a decolorizable layer in a photographic material, and are used in this use in a conventional manner.

Further, since the 1-position of the pyrazolone ring of the dyes of this invention is substituted by an alkyl grop having a water soluble group, the diffusion rate of the dyes of this invention during photographic processing differs greatly from that of analogous dyes having an aryl group having a water soluble group in the 1-position of the pyrazolone ring. Consequently, they are removed quickly and completely from layers of the photographic materials. Accordingly, they have the excellent characteristic that residual color is not generated in the case of rapid treatments where all processing steps are carried out within one minute.

For example, results of comparisons of color fading ability with an aqueous solution of sodium sulfite are shown in the following table, in which gelatin films produced using an oxonol dye of the present invention and known oxonol dyes are used.

$$Y-C - C=CH-CH=CH-C - C-Y$$
$$\| \quad | \qquad\qquad\qquad \| \quad \|$$
$$N \quad C=O \quad HO-C \quad N$$
$$\diagdown N \diagup \qquad\qquad \diagdown N \diagup$$
$$| \qquad\qquad\qquad\qquad |$$
$$Z \qquad\qquad\qquad\qquad Z$$

|   | Dye of this invention | Known dye | Known dye |
|---|---|---|---|
| Y | $-COOC_2H_5$ | $-COOH$ | $-CH_3$ |
| Z | $-CH_2CH_2CH_2SO_3H$ | $-\langle\bigcirc\rangle-SO_3H$ | $-\langle\bigcirc\rangle-SO_3H$ |
| Absorption maximum wave length (mμ) | 550 | 540 | 518 |
| Decolorization ratio (%) | 100 | 85 | 83 |

In the table, the absorption maximum wave length is determined on samples prepared by mixing 1.0 ml of an aqueous solution of 100 mg of the dye in 50 ml of distilled water and 5.0 ml of a 10% aqueous gelatin solution, applying the mixture to a glass plate of 12 × 16.5 cm and drying. The optical density of the sample at the absorption maximum wave length is then determined. The sample is then dipped in a 5% aqueous solution of sodium sulfite at 20°C for 30 seconds with stirring and dried. Then the optical density of the sample at the absorption maximum wave length is again determined. The decolorization ratio is calculated from these optical densities by the following equation.

Decolorization ratio = Optical density before treatment − Optical density after treatment/Optical density before treatment × 100

As is clear from the above results, the dyes according to the present invention have a good decolorizing property as compared with the known dyes. Further, the known dyes stain the aqueous solution of sodium sulfite because they have an inferior decolorization property upon reduction by sodium sulfite. On the contrary, the dyes according to the present invention do not stain at all.

The good decolorization ability of the dyes according to the present invention is kept without being influenced by the kind of carboxylic acid ester group at the 3-position of the pyrazolone ring. The dyes according to the present invention have a sulfonic acid group or a carboxyl group at the alkyl group in the 1-position of the pyrazolone ring. These groups render the dyes water soluble and improve the decolorization ability of the dyes in the aqueous solution containing sodium sulfite. Namely, dyes which do not have a water soluble group such as a sulfonic acid group or a carboxyl group at $R_2$ of formula (I) have an inferior decoloring property. Therefore, they are clearly distinguished from dyes of the present invention.

The present invention will now be illustrated in greater detail by the following examples.

EXAMPLE 1

Synthesis of the following dye:

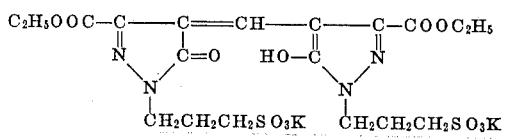

A mixture composed of 2.78 g of 1-sulfopropyl-3-ethoxycarbonyl-5-pyrazolone, 1.96 g of diphenylformamidine, 2.0 g of triethylamine and 15 ml of N,N-dimethylformamide was refluxed at normal pressure for 30 minutes. Fifty (50) ml of a hot methanol solution containing 1.5 g of anhydrous potassium acetate was added to the resulting yellow reaction solution. The mixture was refluxed for 5 minutes and ice cooled to precipitate yellow crystals. After filtration and drying, 1.9 g of yellow dye was obtained. An aqueous solution (1/100,000 parts by weight, same in all Examples) of this dye had a yellowish orange color and an absorption maximum wave length of at 477 m$\mu$.

Dyes having a similar yellowish-orange color were obtained by using 1-sulfobutyl-3-ethoxycarbonyl-5-pyrazolone, 1-sulfopropyl-3-butoxycarbonyl-5-pyrazolone, 1-sulfo-2'-methylpropyl-3-butoxycarbonyl-5-pyrazolone, 1-sulfo-2',2'-dimethylpropyl-3-decaoxycarbonyl-5-pyrazolone or 1-sulfo-4'-ethylbutyl-3-ethoxycarbonyl-5-pyrazolone instead of 1-sulfopropyl-3-ethoxycarbonyl-5-pyrazolone in Example 1, and orthoformic acid ester, orthoacetic acid ester or orthopropionic acid ester instead of diphenylformamidine.

EXAMPLE 2

Synthesis of the following dye:

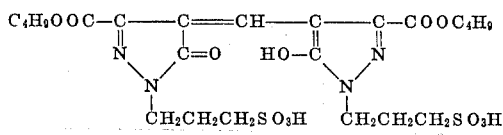

A mixture of 3.06 g of 1-sulfopropyl-3-butoxycarbonyl-5-pyrazolone, 2.0 g of orthoformic acid ester, 2.0 g of triethylamine and 20 ml of N,N-dimethylacetamide was refluxed at normal pressure for 30 minutes. After cooling the reaction solution with ice, a mixture of 2 ml of hydrochloric acid and 30 ml of methanol was added thereto, by which yellow crystals precipitated. These yellow crystals were separated by filtration and washed with methanol and then with acetone to obtain 2.2 g of yellow dye. An aqueous solution of this dye had a yellowish orange color. The absorption maximum wave length of the dye was 477 m$\mu$.

EXAMPLE 3

Synthesis of the following dye:

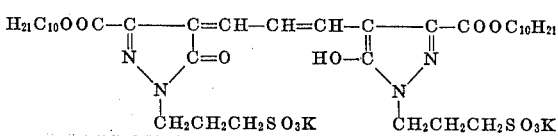

A mixture composed of 3.9 g of 1-sulfopropyl-3-decaoxycarbonyl-5-pyrazolone, 1.3 of malondialdehyde dianil hydrochloride, 50 ml of methanol and 2 g of triethylamine was refluxed at normal pressure for 3 hours on a water bath. Then, 50 ml of methanol containing 1.5 g of anhydrous potassium acetate was added thereto. By refluxing for 5 minutes, crystals precipitated. These crystals were separated by filtration, washed with methanol and dried to obtain 2.3 g of a dye. An aqueous solution of this dye had a reddish violet color. The absorption maximum wave length of this dye was 554 m$\mu$.

Dyes having a similar reddish-violet color were obtained by using 1-sulfopropyl-3-ethoxycarbonyl-5-pyrazolone, 1-sulfobutyl-3-ethoxycarbonyl-5-pyrazolone, 1-sulfopropyl-3-butoxycarbonyl-5-pyrazolone, 1-sulfo-2',2'-dimethylpropyl-3-decaoxycarbonyl-5-pyrazolone or 1-sulfo-4'-ethylbutyl-3-ethoxycarbonyl-5-pyrazolone instead of 1-sulfopropyl-3-decaoxycarbonyl-5-pyrazolone used in Example 3, and tetramethoxypropane or $\beta$-methylmalondialdehyde dianil hydrochloride instead of malondialdehyde dianil hydrochloride.

EXAMPLE 4

Synthesis of the following dye:

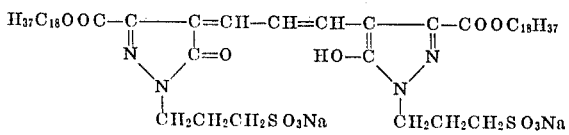

A mixture composed of 5.02 g of 1-sulfopropyl-3-octadecaoxycarbonyl-5-pyrazolone, 2.0 g of tetramethoxypropane, 50 ml or methanol and 2 g of triethylamine was refluxed at atmospheric pressure for 3 hours on a steam bath. The reaction solution gradually changed from a red color to a dark reddish-violet color. Then, 20 ml of an aqueous solution containing 5 g of sodium acetate (3H$_2$O) was added thereto. After refluxing or 5 minutes, the aqueous solution was cooled with ice. The precipitated dark violet crystals were separated by filtration, washed with methanol and then with acetone and dried to obtain 5.1 g of dark red crystals. An aqueous solution of this dye had a reddish violet color. The absorption maximum wave length of this dye was 556 m$\mu$.

EXAMPLE 5

Synthesis of the following dye:

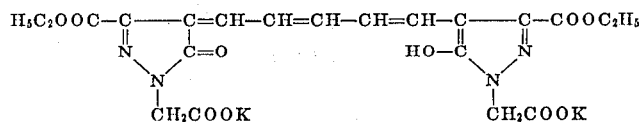

A mixture composed of 4.28 g of 1-carboxymethyl-3-ethoxycarbonyl-5-pyrazolone, 2.84 g of glutacondialdehyde dianil hydrochloride, 30 ml of methanol, 30 ml of N,N-dimethylformamide and 3.2 g of diethanolamine was stirred at 10°–15°C for 4 hours at atmospheric pressure. The reaction solution gradually changed to a blue color. By adding 50 ml of methanol containing 1.12 g of potassium hydroxide, the potassium salt of the dye was precipitated. After stirring at a room temperature for about 20 minutes, the crystals were filtered and dried in vacuum. 4.1 g of greenish blue crystals were thus obtained. An aqueous solution of this dye had a deep blue color. The absorption maximum wave length of this dye was 660 m$\mu$.

Dyes having a nearly deep blue color were obtained by using 1-sulfobutyl-3-ethoxycarbonyl-5-pyrazolone, 1-sulfobutyl-3-methoxycarbonyl-5-pyrazolone, 1-sulfopropyl-3-butoxycarbonyl-5-pyrazolone, 1-sulfopropyl-3-ethoxycarbonyl-5-pyrazolone, 1-sulfopropyl-3-methoxycarbonyl-5-pyrazolone, 1-sulfo-2',2'-dimethylpropyl-3-decaoxycarbonyl-5-pyrazolone, 1-sulfo-4'-ethylbutyl-3-ethoxycarbonyl-5-pyrazolone, 1-carboxyethyl-3-methoxycarbonyl-5-pyrazolone, 1-carboxyethyl-3-ethoxycarbonyl-5-pyrazolone, 1-carboxyethyl-3-butoxycarbonyl-5-pyrazolone, 1-carboxymethyl-3-methoxycarbonyl-5-pyrazolone, 1-carboxymethyl-3-butoxycarbonyl-5-pyrazolone, 1-carboxymethyl-3-decaoxycarbonyl-5-pyrazolone or 1-carboxymethyl-3-octadecaoxycarbonyl-5-pyrazolone instead of 1-carboxymethyl-3-ethoxycarbonyl-5-pyrazolone used in Example 5, or γ-methyl-glutacondialdehyde dianil hydrochloride, γ-ethyl-glutacondialdehyde dianil hydrochloride, 2',4'-dinitro-4-methylpyridinium chloride, 2',4'-dinitro-4-phenylpyridinium chloride or 2',4'-dinitro-4-ethylpyridinium chloride instead of glutacondialdehyde dianil hydrochloride.

EXAMPLE 6

Synthesis of the following dye:

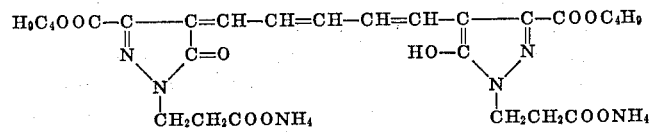

Ammonia gas was introduced into a mixture composed of 4.56 g of 1-carboxyethyl-3-butoxycarbonyl-5-pyrazolone, 50 ml of ethanol and 2.8 g of 2,4-dinitrobenzene pyridinium chloride with stirring at 10°–20°C, by which the contents dissolved. After introducing an excess amount of ammonia gas, indicated by bubbles forming on the surface of the mixture, the mixture was allowed to stand overnight at room temperature and a brilliant green ammonium salt precipitated. This dye was separated by filtering, washed with ethanol and then with acetone, and dried. Thus, 4.4 g of the dye was obtained. An aqueous solution of this dye had a deep blue color. The absorption maximum wave length of the dye was 661 m$\mu$.

EXAMPLE 7

Synthesis of the following dye:

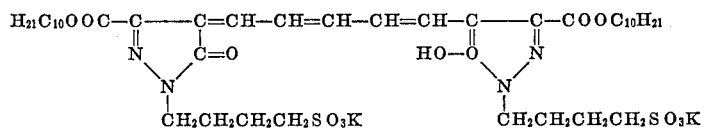

Ammonia gas was introduced into a mixture of 8.1 g of 1-sulfobutyl-3-decaoxycarbonyl-5-pyrazolone, 100 ml of ethanol and 1.9 g of cyanopyridinium bromide at 10°–20°C with stirring, by which the contents dissolved. After introducing an excess amount of ammonia gas, indicated by bubbles forming on the surface of the mixture, the system was stirred for 4 hours. Then, 100 ml of hot methanol containing 2.5 g of potassium acetate was added thereto, by which the potassium salt of the dye immediately precipitated. The crystals were separated by filtration, washed with 30 ml of methanol and then with 100 ml of acetone, and dried. Thus, 7.0 g of the dye was obtained. An aqueous solution of this dye had a deep blue color. The absorption maximum wave length was 663 m$\mu$.

While the invention has been described in detail and with reference to specific embodiments thereof, it will be apparent to one skiled in the art that various changes and modifications can be made therein without departing from the spirit and scope thereof.

What is claimed is:

1. An oxonol dye selected from the dyes of the formula

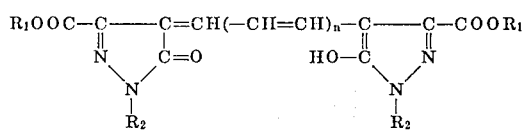

wherein $R_1$ represents a $C_1$–$C_{18}$ alkyl group, a phenyl group or a naphthyl group, $R_2$ represents a $C_1$–$C_6$ alkyl group having a sulfonic acid group or carboxyl group, $n$ is 0, 1 or 2, and the methine chain may be substituted by an alkyl group, a phenyl group or a naphthyl group.

2. An oxonol dye as claimed in claim 1 wherein $R_1$ is selected from the group consisting of hydroxyalkyl, cyanoalkyl, hydroxyalkoxyalkyl where the alkyl moiety has 1–18 carbon atoms.

3. An oxonol dye as claimed in claim 1 wherein $R_1$ is benzyl.

4. An oxonol dye as claimed in claim 1 wherein $R_1$ is phenyl or naphthyl.

5. An oxonol dye as claimed in claim 4 wherein $R_1$ is benzyl, halogen or alkoxy substituted phenyl or naphthyl.

6. An oxonol dye as claimed in claim 1 wherein $R_1$ is methyl, ethyl, hydroxyethyl, cyanoethyl, hydroxyethoxyethyl, propyl, isopropyl, butyl, tert-butyl, hexyl, octyl, decyl, dodecyl, pentadecyl, octadecyl, or benzyl, $R_2$ is phenyl, tolyl, ethylphenyl, chlorophenyl, methoxyphenyl, naphthyl, sulfomethyl, carboxymethyl, sulfoethyl, carboxyethyl, sulfopropyl, sulfo-2-methylpropyl, sulfo-2,2-dimethylpropyl, sulfobutyl, carboxybutyl, sulfo-4-ethylbutyl or sulfopentyl, and the methine chain, if substituted, is substituted with methyl, ethyl, hydroxymethyl, propyl, t-butyl or phenol.

7. An oxonol dye as claimed in claim 1 wherein the oxonol dye is of the formula

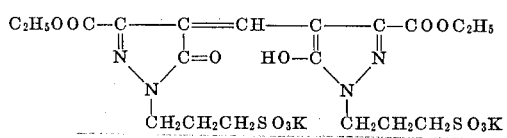

8. An oxonol dye as claimed in claim 1 wherein the oxonol dye is of the formula

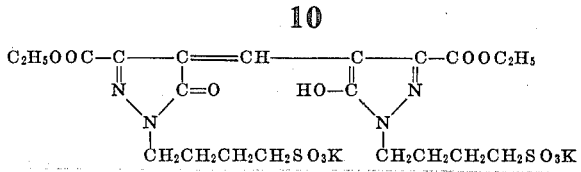

9. An oxonol dye as claimed in claim 1 wherein the oxonol dye is of the formula

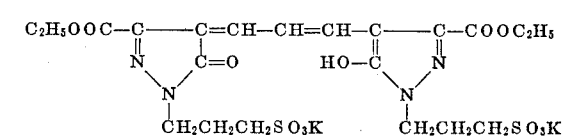

10. An oxonol dye as claimed in claim 1 wherein the oxonol dye is of the formula

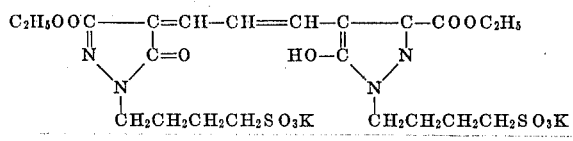

11. An oxonol dye as claimed in claim 1 wherein the oxonol dye is of the formula

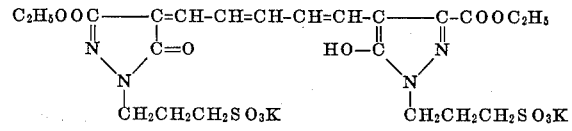

* * * * *